US00RE34398E

United States Patent [19]

Bridges

[11] E Patent Number: Re. 34,398

[45] Reissued Date of Patent: Oct. 5, 1993

[54] APPARATUS FOR AND METHOD OF MANUFACTURING BRUSH SEALS

[75] Inventor: Stuart A. Bridges, Alveston, England

[73] Assignee: Rolls-Royce plc, London, England

[21] Appl. No.: 897,453

[22] Filed: Jun. 10, 1992

Related U.S. Patent Documents

Reissue of:

[64] Patent No.: 4,934,759
Issued: Jun. 19, 1990
Appl. No.: 330,203
Filed: Mar. 29, 1989

[30] Foreign Application Priority Data

Apr. 5, 1988 [GB] United Kingdom ..... 8807919

[51] Int. Cl.[5] ..... B25B 1/20

[52] U.S. Cl. ..... 300/11; 29/423; 300/21

[58] Field of Search ..... 29/423, 445; 300/10, 300/11, 18, 21; 83/170

[56] References Cited

U.S. PATENT DOCUMENTS

Re. 30,206 2/1980 Ferguson et al. .
4,274,575 6/1981 Flower .
4,642,867 2/1987 Hough et al. .
4,671,113 6/1987 Bridges et al. .

FOREIGN PATENT DOCUMENTS 2001400A 1/1979 United Kingdom .
2012574A 8/1979 United Kingdom .

*Primary Examiner*—Timothy V. Eley
*Attorney, Agent, or Firm*—Oliff & Berridge

[57] ABSTRACT

This invention provides an apparatus for and method of manufacturing a brush seal. The apparatus comprises an annular former 22 having a radially outer 24 and a radially inner 30 portion radially separated from each other by an amount G and held relative to each other by locating means 32, and further includes a travelling wire electro discharge machining device and a guide tube. A brush seal 10 is wound onto the former in the usual manner and the filament material 38 cut in the region of the gap G by the travelling wire 44. The wire is inserted between the filaments by first inserting a tube 52 therebetween and passing the wire 44 therethrough. Machining of the filament material is achieved by traversing the wire around the gap G.

16 Claims, 2 Drawing Sheets

APPARATUS FOR AND METHOD OF MANUFACTURING BRUSH SEALS

Matter enclosed in heavy brackets [ ] appears in the original patent but forms no part of this reissue specification; matter printed in italics indicates the additions made by reissue.

FIELD OF THE INVENTION

This invention relates to an apparatus for, and method of, manufacturing brush seals. It relates in particular not exclusively, to brush seals produced by the winding technique.

Brush seals are already well known per se and are therefore not described in detail herein. Briefly, however, they comprise a pair of generally annular sideplates and a plurality of closely packed metallic bristles. The bristles are sandwiched between the sideplates and extend radially therefrom. The free ends of the bristles act against a relatively rotating component to effect a seal.

DESCRIPTION OF THE RELATED ART

The production of brush seals by winding is already well known and is described in detail in UK Patent No. 2001400B. Briefly, however, the process involves winding a filament of wire onto an annular former having two seals sideplates incorporated therein and sandwiching the wire between a second pair of sideplates. Each of the two sideplates on either side of the former are then integrally joined to the wire situated therebetween by for example welding or brazing. The otherwise free ends of the wire are then cut away from the former to allow the two seals to be separated therefrom. Final finishing of the wire, or rather bristle, may be achieved by grinding.

One well known method of grinding makes use of a centreless grinding technique. This method is time consuming, expensive and lacks accuracy. Further to this, it has been found that the bristle elements bend away from the grinding wheel and make accurate machining difficult.

It is an object of the present invention to reduce and possibly eliminate the disadvantages of the above mentioned method of manufacture by providing an apparatus for and method of manufacture brush seals which makes use of the advantages of electro discharge machining, is simple, accurate and which lends itself to both automation and batch processing.

SUMMARY OF THE INVENTION

The apparatus of the invention comprises an annular former having radially outer and inner portions radially separated from each other by a gap and held relative to each other by locating means, and further includes a travelling wire electro discharge machining device and a guide tube. A brush seal is wound onto the former and the filament material cut in the region of the gap by the travelling wire. The wire is inserted between the filaments by first inserting a tube therebetween and passing the wire therethrough. Machining of the filament material is achieved by traversing the wire around the gap.

BRIEF DESCRIPTION OF THE DRAWINGS

The present invention will now be described by way of example only with reference to the accompanying drawings, in which.

DESCRIPTION OF THE PREFERRED EMBODIMENT

Figure 1:
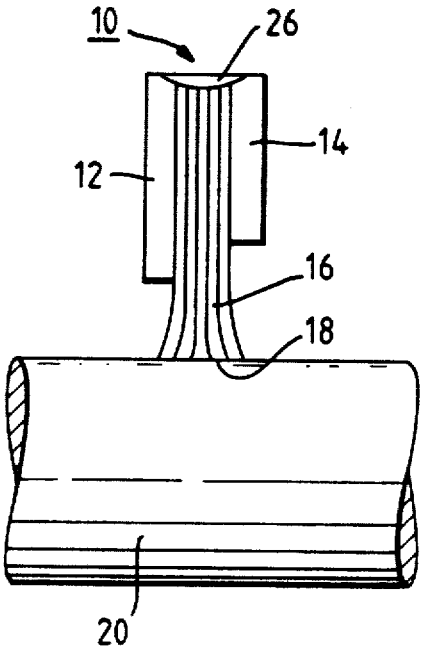
FIG. 1 is a cross sectional view of a brush seal.

Referring to FIG. 1, a brush seal 10 generally comprises one long and one short annular sideplate 12,14 and a plurality of bristle elements 16 which are sandwiched therebetween and which extend generally radially therefrom. The bristles shown extend generally radially inwards and their free ends 18 act against a rotating component such as for example a shaft 20 to effect a seal therebetween.

Figure 2:
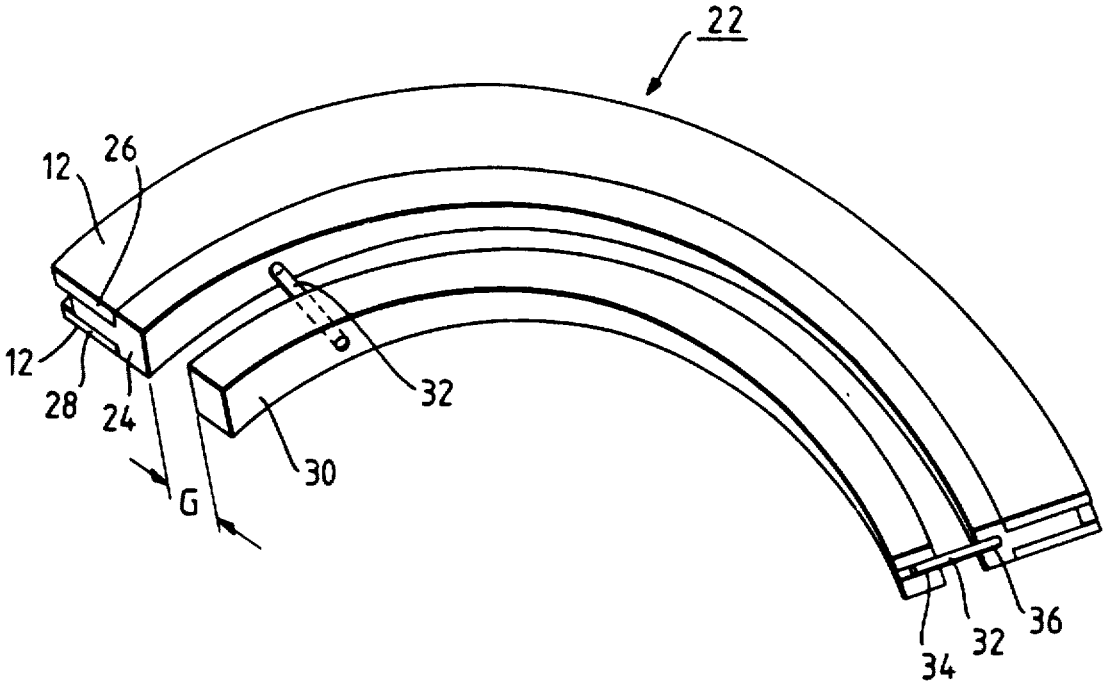
FIG. 2 is a general view of a portion of an annular former onto which the bristle elements of the brush seal are wound.

Turning now to FIG. 2, the annular former of the present invention 22 comprises a first radially outer portion 24, having a pair of annular sideplates 12 situated in recesses 26,28 provided on either side thereof and a second inner portion 30. The second inner portion 30 is spaced radially from the outer portion 24 by a predetermined amount G, and held relative thereto by a plurality of pins 32 which locate in holes 34,36 provided in both portions 24,30.

Figure 3:
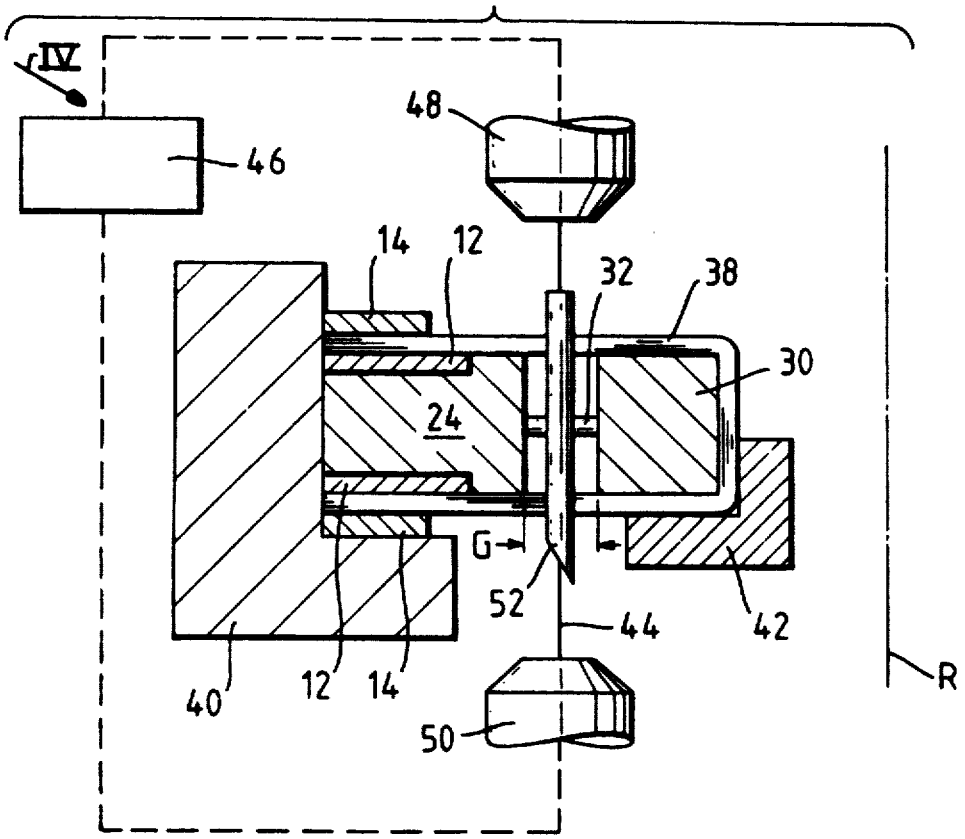
FIG. 3 is a cross sectional view of the annular former shown in FIG. 2 having bristle elements wound thereon and an ED wire cutting apparatus inserted therein.

A filament of bristle material 38 is wound onto the annular former 22 in the conventional manner. It will, however, be appreciated that the filament 38 will lie over the gap G on both sides of the former 22 as shown in FIG. 3. The outer annular sideplates 14 are then applied to the outer surface of the wound filament adjacent their associated sideplates 12. The joining operation is then performed by for example welding the two pairs of sideplates 12,14 to each other and the bristle material 38 sandwiched therebetween and any surplus material removed by for example grinding.

Figure 4:
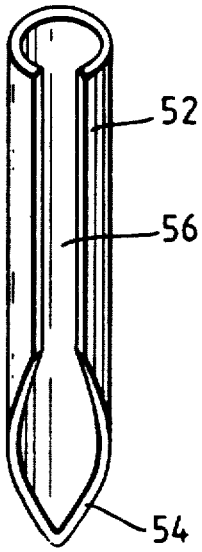
FIG. 4 is a perspective view of part of the cutting apparatus of FIG. 3, taken in the direction of arrow IV.

Prior to machining the internal diameter of the brush seal 10, the outer 24 and if necessary the inner 30 portions of the former are supported in fixtures 40 and 42 respectively. The cutting wire 44 from a travelling wire electro discharge machining apparatus 46 is passed between the layers of the bristle material 38 in the region of the gap G and connected for operation to the apparatus 46 via machining heads 48,50 respectively. In order to facilitate the passing of the wire 44 through the mass of bristle material 38 it may be necessary to employ a tube 52 which is inserted between the bristle material prior to passing the wire 44 therethrough. Preferably, the tube is provided with a chamfered end 54 (best seen in FIG. 4) and a slot 56 along its length L. The chamfered end aids the passage thereof through the bristle material 38, whilst the slot 56 provides an outlet for the wire 44 during machining or allows the tube 52 to be removed prior to machining.

The filament material 38 is cut to size by passing a machining current through the cutting wire 44 and moving it in a circle along the gap G. It will be appreciated that the wire will cut through the filament material as it is so traversed together with any locating pins 32.

It will be further appreciated that an accurate circular form may be machined by for example rotating the support means 40,42 and hence the seal 10 about a central axis of rotation R. Once all the filament material has been cut, the wire 44 may be removed and the two finished seals separated from the former 22.

It will be appreciated that the effect of the inner portion 30 is to locate the ends of the filaments of bristle material 38 not sandwiched between the sideplates 12,14 (the otherwise free ends) in order to facilitate the machining operation. It will be further appreciated that the above mentioned method of machining may be used on brush seals 10 not produced by a winding technique if the otherwise free ends of said seals 10 are similarly constrained by a locating means and a similar gap G provided between the annular sideplates 12,14 of said seal 10 and said locating means. Machining of the bristle elements 18 in the region of the gap may be achieved in the same manner as described above.

It will be still further appreciated that both the above described methods may be adopted for batch processing by stacking a number of seals 10 on top of each other such that the gaps G are in line with each other and by using the same cutting wire 44 to cut through all the bristle filaments 38 in the region of all the gaps in one operation.

I claim:

1. An apparatus for manufacturing a brush seal of the type which comprise a pair of annular sideplates having a plurality of filaments of bristle material sandwiched therebetween and projecting radially therefrom and which is produced by winding onto an annular former, the apparatus comprising an annular former having a first radially outer portion having a recess formed on either side thereof to receive a pair of annular sideplates, and a second inner portion spaced radially from the outer portion by a predetermined amount, thereby to define a gap, and held relative thereto by locating means there being further provided means for cutting the filament material in the region of the gap and means comprising a tube for enabling the cutting means to be passed through the filaments.

2. An apparatus according to claim 1 in which the cutting means comprises a travelling wire electro discharge machining apparatus having the machining wire inserted through the filament material in the region of the gap.

3. An apparatus according to claim 1 in which the tube is provided with a slot along its length and a chamfered end.

4. An apparatus for manufacturing a brush seal of the type which comprise a pair of annular sideplates having a plurality of filaments of bristle material sandwiched therebetween between and projecting radially therefrom and which is produced by winding onto an annular former, the apparatus comprising an annular former having a first radially outer portion having a recessed former on either side thereof to receive a pair of annular sideplates, and a second inner portion spaced radially from the outer portion by a predetermined amount, thereby to define a gap, and held relative thereto by locating means comprising a plurality of locating pins which locate in holes provided in the outer and inner portions of the annular former.

5. A method of manufacturing a brush seal of the type which comprises a pair of annular sideplates having a plurality of filaments of bristle material sandwiched therebetween, and which is produced by winding onto an annular former having a first radially outer portion having a recess formed on either side thereof to receive a pair of annular sideplates and a second inner portion spaced radially from the outer portion by a predetermined amount, thereby to define a gap, and held relative thereto by locating means, the method including the step of cutting the filaments of bristle material in the region of the gap, thereby to release the seal from the former, in which the machining wire of a travelling wire electro discharge machining apparatus is used to cut the filaments of bristle material and the machining wire is passed through the filaments of bristle material by first inserting a tube through said filaments and then passing said machining wire through said tube.

6. A method of manufacturing a brush seal of the type which comprises a pair of annular sideplates having a plurality of filaments of bristle material sandwiched therebetween, and which is produced by winding onto an annular former having a first radially outer portion having a recess formed on either side thereof to receive a pair of annular sideplates and a second inner portion spaced radially from the outer portion by a predetermined amount, thereby to define a gap, and held relative thereto by locating means, the method including the step of cutting the filaments of bristle material in the region of the gap, thereby to release the seal from the former, in which the machining wire of a travelling wire electro discharge machining apparatus is used to cut the filaments of bristle material, and in which the machining wire cuts through the filaments of bristle material and the locating means as it is traversed around the gap.

*7. An apparatus for manufacturing a brush seal including a pair of sideplates having a plurality of filaments of bristle material sandwiched therebetween and projecting therefrom, the apparatus comprising:*

*support means for supporting at least one pair of sideplates with the filaments projecting radially therefrom; and*

*a travelling wire electro discharge machining apparatus having a machining wire extending through the filaments for cutting the filaments; and*

*moving means for moving at least one of the support means and machining wire relative to the other for cutting the filaments.*

*8. The apparatus of claim 7, wherein a plurality of pairs of sideplates are supported in a stack in the support means, and the machining wire cuts the filaments in the stack of sideplates.*

*9. The apparatus of claim 7, wherein the sideplates are annular, and one of the support means and the machining wire moves circularly relative to the other.*

*10. The apparatus of claim 7, further comprising locating means for constraining free ends of the filaments, and the machining wire is located in a gap between the sideplates and the locating means.*

*11. The apparatus of claim 7, wherein the moving means moves the machining wire relative to the support means.*

*12. A method for manufacturing a brush seal including a pair of sideplates having a plurality of filaments of bristle material sandwiched therebetween and projecting therefrom, the method comprising the steps of:*

*supporting at least one pair of sideplates with the filaments projecting radially therefrom;*

*extending a machining wire of a travelling wire electro discharge machining apparatus through the filaments; and*

*moving at least one of the sideplates and the machining wire of the travelling wire electro discharge machining apparatus relative to the other to cut the filaments.*

*13. The method of claim 12, wherein the step of supporting includes the step of stacking a plurality of pairs of sideplates for simultaneously cutting the filaments in the stacks of sideplates.*

*14. The method of claim 12, wherein the sideplates are annular and one of the sideplates and the machining wire moves circularly relative to the other.*

*15. The method of claim 12, further comprising the steps of constraining free ends of the filaments by a locating mechanism spaced from the sideplates by a gap, and locating the machining wire in the gap.*

*16. The method of claim 12, wherein the machining wire is moved.*

* * * * *